United States Patent [19]

Disselbeck et al.

[11] 4,230,175
[45] Oct. 28, 1980

[54] HEAT EXCHANGER ELEMENT

[75] Inventors: Dieter Disselbeck, Bad Soden am Taunus; Eduard Hilscher, Idstein; Klaus Speier, Kelkheim, all of Fed. Rep. of Germany

[73] Assignee: Hoechst Aktiengesellschaft, Frankfurt am Main, Fed. Rep. of Germany

[21] Appl. No.: 877,285

[22] Filed: Feb. 13, 1978

[30] Foreign Application Priority Data

Feb. 15, 1977 [DE] Fed. Rep. of Germany ..... 27044543
Apr. 2, 1977 [DE] Fed. Rep. of Germany ..... 27149015

[51] Int. Cl.³ .............................................. F28F 3/12
[52] U.S. Cl. ..................................... 165/46; 165/170
[58] Field of Search ................... 165/46, 48, 49, 170, 165/48 S, DIG. 8

[56] References Cited

U.S. PATENT DOCUMENTS

| 1,803,764 | 5/1931 | Miller | 165/46 |
| 3,236,294 | 2/1966 | Thomason | 165/48 S |
| 3,485,245 | 12/1969 | Lahr et al. | 165/46 |
| 3,612,059 | 10/1971 | Ersek | 165/46 |
| 3,830,676 | 8/1974 | Elkins | 165/46 |
| 4,098,331 | 7/1978 | Ford et al. | 165/170 |

FOREIGN PATENT DOCUMENTS

| 1963680 | 6/1971 | Fed. Rep. of Germany | 165/53 |
| 2148401 | 4/1973 | Fed. Rep. of Germany | |
| 250484 | 6/1948 | France | 165/46 |
| 905760 | 9/1962 | United Kingdom | |
| 1037959 | 8/1966 | United Kingdom | |
| 1213123 | 11/1970 | United Kingdom | 165/46 |
| 1486622 | 9/1977 | United Kingdom | |
| 1497261 | 1/1978 | United Kingdom | |

Primary Examiner—Sheldon Richter
Attorney, Agent, or Firm—Curtis, Morris & Safford

[57] ABSTRACT

A heat exchanger element consists of a double fabric web coated on both sides, the distance between the face fabric and the back fabric of which is maintained by binder filaments. This double fabric web is provided with a feeder duct and discharge duct for liquid and gaseous media. The heat exchanger element is used as heat absorber or heater element. It is distinguished by its flexibility. As heater element, it may be doubled with carpet material or used as wall-to-wall carpet.

7 Claims, 1 Drawing Figure

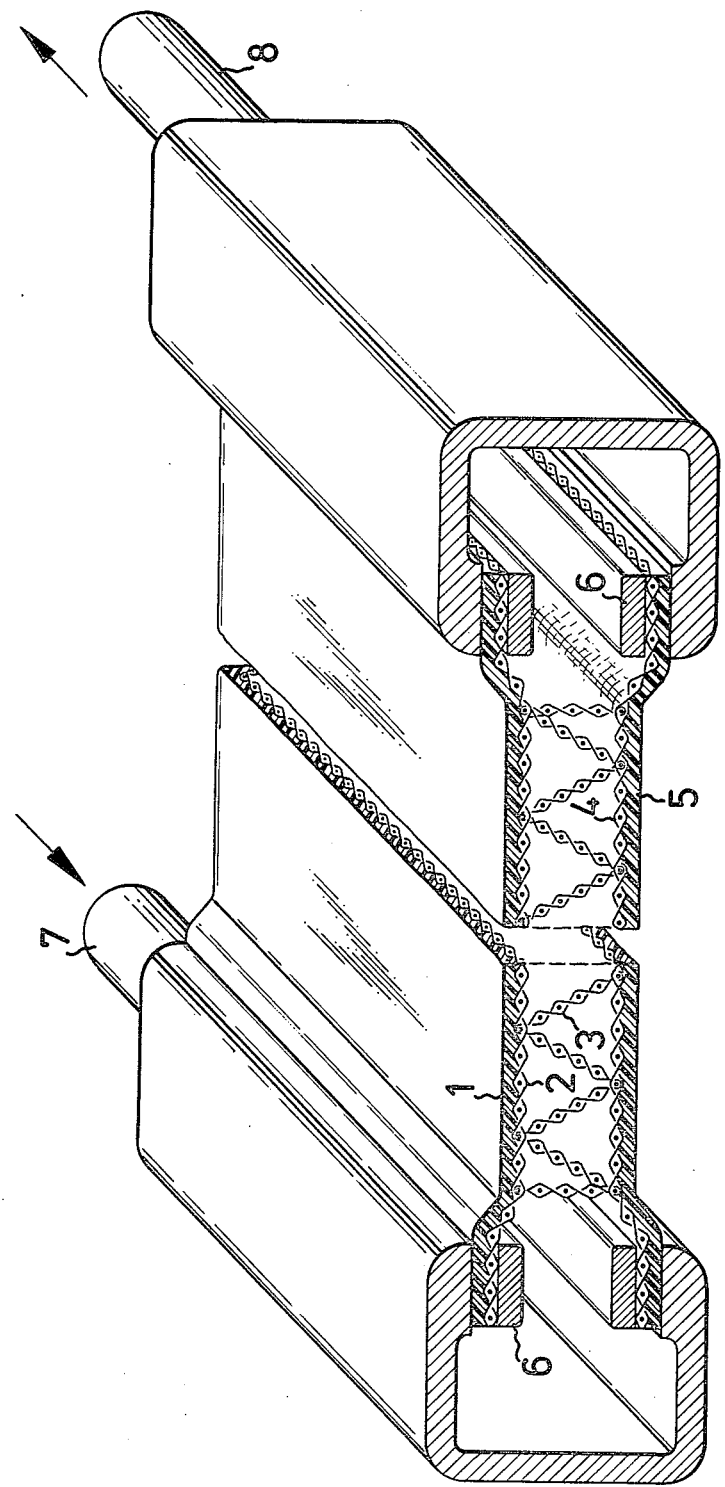

HEAT EXCHANGER ELEMENT

The present invention relates to a heat exchanger element and heater.

Solar radiation energy is converted to useful heat by means of a technical device called a collector. Essential element of a collector is the absorber, where a heat transfer medium circulates in order to dissipate the absorbed solar radiation energy.

The radiation of the sun is absorbed preferably by a blackened area of the absorber, and water is preferably used as the heat transfer medium.

Therefore, material and design of the absorber have to meet all corresponding requirements with respect to protection from corrosion, heat resistance and tightness. For reasons of economic utilization of solar energy, it is furthermore required that cost-price and processing costs for the material be as low as possible and the efficiency of radiation energy conversion to heat be as high as possible.

The metallic materials generally used for this application, especially aluminum, have numerous disadvantages. They reside above all in the fact that the use of water as a heat transfer liquid requires the addition of anti-corrosive and anti-freeze agents. In the case of warm water supply by such absorbers, a closed circulation system with heat exchangers is required, involving the risk that the anti-corrosive and anti-freeze agents are passed into the potable water system.

When plastic materials are employed, anti-corrosive and anti-freeze agents may be omitted.

In buildings having a central heating system, heat exchange is ensured by fixed radiators of metal or plastic material, or by floor or ceiling heating systems, which are incorporated into the floors or ceilings and thus form an integral part of the building. Their installation at a later date into exisiting buildings is generally impossible for technical and economic reasons.

For a rational utilization of energy, and for an ecomomic use of environment heat such as solar energy and heat pumps, it becomes more and more interesting to employ large-area heating elements such as floor heating systems, because this allows heating at low temperatures of the heating fluids used.

It is an object of the present invention to provide heat exchanger elements which are corrosion-proof to various media, especially water, which are flexible and can be manufactured at reasonable cost by conventional processes (weaving, coating). It is a further object of this invention to provide a large-area heat exchanger which can be mounted in a simple manner and without affecting the construction of a building to existing surfaces of floors, ceilings or walls, so that an economic installation at low engineering expenditure of a modern energy-utilizing system into existing buildings becomes possible.

In accordance with this invention, there is provided a heat exchanger element consisting of a coated double fabric web, the distance between the face fabric and the back fabric of which is maintained by binder filaments, so that a hollow space is formed in this manner, and furthermore suitable devices for the feeding and discharge of liquid or gaseous media.

Such elements may be used also in other fields, for example as a heat exchanger for heavily corrosive media.

Depending on the requirements, the fabric may consist of polyesters, polyamides, polytetrafluoroethylene, glass or other filaments; the binder filaments are preferably monofilaments of the same materials.

Coating is carried out according to known processes, either by doubling with sheets of metals or polyesters or polyolefins, or by coating with PVC pastes or synthetic rubber such as polychloroprene, butyl rubber, polyurethane, fluorinated rubber etc.

The invention will be better understood by reference to the accompanying drawing which shows a cross-sectional view of an embodiment of the heat exchanger element of the invention, and in which 1 represents the coating on the face, 2 the face fabric, 3 the binder filaments, 4 the back fabric, 5 the coating on the back, 6 a spacer, 7 the feeder pipe and 8 the discharge pipe for the heat transfer medium.

According to a further embodiment of the invention, the heat exchanger element is a heater element which consists also of a coated double fabric web, the distance between the face fabric and the back fabric of which is maintained by binder filaments, so that a hollow space is formed in this manner, and which is not subject to deformation by the heat transfer medium passing through it. This heater element is provided with suitable devices for feed and discharge of the heat transfer medium. The double fabric structure allows to pass the heat transfer medium through the heater element, in analogy the absorber element, in thin layers down to 1 mm, preferably 2 to 4 mm, and large areas, and thus to utilize heating mediums of low temperature for room heating of optimum effect.

Because of their flexible, textile nature, their low thickness and flat surface on both sides, the elements may be used as heater mats, which may serve for example as floor heating system below carpets (also from wall to wall), insulated by a corresponding doubling, or even as heatable wall-to-wall carpet by being directly linked to the carpet material on one side.

Furthermore, the heater elements of the invention, with or without being doubled with insulating or carrier materials, may be used in a technically simple manner as ceiling or wall heating.

Because of their textile nature and the corresponding flexibility, they may be used also (with or without suitable doubling) as contact heater mats (for example warming pads or mats).

The heater element is made from the same materials as described for the absorber elements, and it is of the same design.

What is claimed is:

1. A heat exchanger element comprising a flexible face fabric coated on one side with an impervious material, a flexible back fabric coated on one side with a liquid impervious material spaced from said face fabric with the uncoated sides thereof facing each other; a binder of flexible material positioned between and secured to the uncoated sides of said face and back fabrics; said face and back fabrics being formed of textile fabrics and said binder material being formed of binder filaments positioned between and secured to the uncoated sides of said textile fabrics to maintain said textile fabrics in spaced relation to each other; a feeder duct and a discharge duct for heat exchange medium communicating with the space between said face and back fabrics whereby said heat exchange medium is adapted to flow between said coated fabrics between said binder filaments.

2. A heat exchanger element as claimed in claim 1, wherein said textile fabrics are formed of filaments selected from the group consisting of polyesters, polyamides, and polytetrafluorethylene.

3. A heat exchanger element as claimed in claim 1 wherein said binder filaments are formed of monofilaments selected from the group consisting of polyesters, polyamides and polytetrafluoroethylene.

4. Heat exchange element as claimed in any one of claims 1, 2, or 3, which comprises its being doubled with carpet material, its being mounted as wall-to-wall carpet.

5. A heat exchanger as claimed in either one of claims 1, 2 or 3 wherein said textile fabrics each include an additional sheet selected from the group consisting of metal, polyolefin and polyester sheets.

6. A heat exchanger element as claimed in either one of claims 1, 2 or 3 wherein said textile fabrics are coated with polyvinyl chloride paste.

7. A heat exchanger element as claimed in either one of claims 1, 2 or 3 wherein said coated textile fabrics are coated wih synthetic rubber.

* * * * *

UNITED STATES PATENT AND TRADEMARK OFFICE
CERTIFICATE OF CORRECTION

PATENT NO. : 4,230,175
DATED : October 28, 1980
INVENTOR(S) : Disselbeck et al.

It is certified that error appears in the above-identified patent and that said Letters Patent are hereby corrected as shown below:

In the Heading, Item [30], Foreign Application Priority Data, the German application numbers "27044543" and "27149015" should read -- 7704454 and 2714901 --, respectively.

Signed and Sealed this

Seventh Day of July 1981

[SEAL]

Attest:

RENE D. TEGTMEYER

Attesting Officer   Acting Commissioner of Patents and Trademarks

REEXAMINATION CERTIFICATE (499th)
United States Patent [19]
Disselbeck et al.

[11] B1 4,230,175
[45] Certificate Issued  May 6, 1986

[54] HEAT EXCHANGER ELEMENT

[75] Inventors: Dieter Disselbeck, Bad Soden am Taunus; Eduard Hilscher, Idstein; Klaus Speler, Kelkheim, all of Fed. Rep. of Germany

[73] Assignee: Hoechst Aktiengesellschaft, Frankfurt am Main, Fed. Rep. of Germany

Reexamination Request:
No. 90/000,257, Sep. 16, 1982

Reexamination Certificate for:
Patent No.: 4,230,175
Issued: Oct. 28, 1980
Appl. No.: 877,285
Filed: Feb. 13, 1978

Certificate of Correction issued Jul. 7, 1981.

[30] Foreign Application Priority Data

Feb. 15, 1977 [DE] Fed. Rep. of Germany ...... 2704454
Apr. 2, 1977 [DE] Fed. Rep. of Germany ...... 2714901

[51] Int. Cl.$^4$ ............................................. F28F 3/12
[52] U.S. Cl. ................................. 165/46; 126/426; 126/445; 165/170
[58] Field of Search ................. 165/46, 49, 170, 48 R, 165/485, 53, 133, DIG. 8, 48.1, 48.2, 905; 423/175; 126/426, 444, 445

[56] References Cited

U.S. PATENT DOCUMENTS

| | | |
|---|---|---|
| 254,265 | 2/1882 | Bone . |
| 2,046,039 | 6/1936 | Schaar . |
| 2,369,736 | 2/1945 | Hurt . |
| 3,022,781 | 2/1962 | Andrassy . |
| 3,830,676 | 8/1974 | Elkins .............................. 165/46 X |

FOREIGN PATENT DOCUMENTS

| | | |
|---|---|---|
| 639353 | 12/1936 | Fed. Rep. of Germany . |
| 661074 | 11/1951 | United Kingdom . |
| 1213123 | 11/1970 | United Kingdom ................. 165/46 |
| 1273634 | 5/1972 | United Kingdom . |
| 1296369 | 11/1972 | United Kingdom . |
| 1439042 | 6/1976 | United Kingdom . |

OTHER PUBLICATIONS

Textile World, Mar. 1968, pp. 40-43.

*Primary Examiner*—Sheldon Richter

[57] ABSTRACT

A heat exchanger element consists of a double fabric web coated on both sides, the distance between the face fabric and the back fabric of which is maintained by binder filaments. This double fabric web is provided with a feeder duct and discharge duct for liquid and gaseous media. The heat exchanger element is used as heat absorber or heater element. It is distinguished by its flexibility. As heater element, it may be doubled with carpet material or used as wall-to-wall carpet.

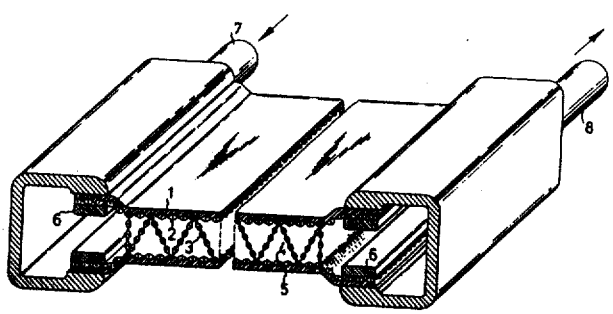

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-7 are cancelled.

* * * * *